US008940881B2

(12) United States Patent
Ifuku et al.

(10) Patent No.: US 8,940,881 B2
(45) Date of Patent: Jan. 27, 2015

(54) METHOD FOR PRODUCING CHITIN NANOFIBERS, COMPOSITE MATERIAL AND COATING COMPOSITION EACH CONTAINING CHITIN NANOFIBERS, AND METHOD FOR PRODUCING CHITOSAN NANOFIBERS, COMPOSITE MATERIAL AND COATING COMPOSITION EACH CONTAINING CHITOSAN NANOFIBERS

(75) Inventors: Shinsuke Ifuku, Tottori (JP); Hiroyuki Saimoto, Tottori (JP); Hiroyuki Yano, Uji (JP); Masaya Nogi, Uji (JP); Yoshihiko Omura, Tottori (JP)

(73) Assignees: Tottori University, Tottori (JP); Kyoto University, Kyoto (JP); Omura Toryo Co., Ltd., Tottori (JP)

( * ) Notice: Subject to any disclaimer, the term of this patent is extended or adjusted under 35 U.S.C. 154(b) by 125 days.

(21) Appl. No.: 13/142,071

(22) PCT Filed: Jun. 30, 2009

(86) PCT No.: PCT/JP2009/061929
§ 371 (c)(1),
(2), (4) Date: Sep. 13, 2011

(87) PCT Pub. No.: WO2010/073758
PCT Pub. Date: Jul. 1, 2010

(65) Prior Publication Data
US 2011/0319528 A1 Dec. 29, 2011

(30) Foreign Application Priority Data
Dec. 26, 2008 (JP) ................................. 2008-334187

(51) Int. Cl.
*C08B 37/08* (2006.01)
*D01F 9/00* (2006.01)
(Continued)

(52) U.S. Cl.
CPC ............... *D01F 9/00* (2013.01); *C08B 37/003* (2013.01); *C09D 105/08* (2013.01);
(Continued)

(58) Field of Classification Search
CPC ............................... C08B 37/003; C08L 5/08
USPC .......................... 536/20; 524/27, 29; 977/795
See application file for complete search history.

(56) References Cited

U.S. PATENT DOCUMENTS

2005/0272876 A1  12/2005  Seko et al.
2007/0272119 A1  11/2007  Ichinose et al.

FOREIGN PATENT DOCUMENTS

JP          56-47453       4/1981
(Continued)

OTHER PUBLICATIONS

Foster, A. B., et al., "Applicantion of ethylenediaminetetra-acetic acid in the isolation of crustacean chitin," Nature, 1957, 180, 40-41.*
(Continued)

*Primary Examiner* — Mark Eashoo
*Assistant Examiner* — Nicholas Hill
(74) *Attorney, Agent, or Firm* — Wenderoth, Lind & Ponack, L.L.P.

(57) ABSTRACT

The present invention provides a method for producing chitin nanofibers, which includes the steps of deproteinizing a material derived from a chitin-containing organism by an alkali treatment, deashing a deproteinized integument by an acid treatment, optionally treating the deashed integument under acidic conditions, and then subjecting to a fiber-loosening treatment. The present invention also provides chitin nanofibers obtained by the method, and a composite material and a coating composition each containing the same. The present invention provides a method for producing chitosan nanofibers, which includes, in addition to the above steps, a deacetylation step and chitosan nanofibers obtained by the method, and a composite material and a coating composition each containing the same.

1 Claim, 4 Drawing Sheets

(51) Int. Cl.
 C09D 105/08 (2006.01)
 C08L 5/08 (2006.01)
 C09D 133/08 (2006.01)
(52) U.S. Cl.
 CPC .............. *C08L 5/08* (2013.01); *C09D 133/08* (2013.01); *Y10S 977/795* (2013.01)
 USPC .................. 536/20; 524/27; 524/29; 977/795

(56) References Cited

FOREIGN PATENT DOCUMENTS

| JP | 4-281017 | 10/1992 |
| JP | 2003-155349 | 5/2003 |
| JP | 2005-344047 | 12/2005 |
| JP | 2007-236551 | 9/2007 |
| JP | 2009-102782 | 5/2009 |
| WO | 2005/116155 | 12/2005 |
| WO | 2009/054512 | 4/2009 |
| WO | WO 2009054512 A1 * | 4/2009 |

OTHER PUBLICATIONS

Goodrich, J. D., et al., "Alpha-Chitin nanocrystals prepared from shrimp shells and their specific surface area measurement," Biomacromolecules, 2007, 252-257.*

Abe, K., et al., "Obtaining cellulose nanofibers with a uniform width of 15 nm from wood," 2007, 8, 3276-3278.*

English-language translation of JP2009-102782. Translation performed at 7:06 JST on Mar. 19, 2013.*

Shellfish News. The Centre for Environment, Fisheries & Aquaculture Science. 1998. pp. 29 and 30.*

Chan et al., "Shrimps and Prawns," The living marine resources of the western central Pacific, p. 851-865, 1998.*

English language translation of JP2009-102782. Translation performed by Schreiber Translation Inc., Sep. 2014.*

English translation of the International Preliminary Report on Patentability mailed Sep. 15, 2011 in corresponding International Application No. PCT/JP2009/061929.

Partial English translation of JP 56-047453.

Fan et al., "Preparation of Chitin Nanofibers from Squid Pen β-Chitin by Simple Mechanical Treatment Under Acid Conditions", *Biomacromolecules*, Jun. 12, 2008, vol. 9, No. 7, pp. 1919-1923.

Min et al., "Chitin and chitosan nanofibers: electrospinning of chitin and deacetylation of chitin nanofibers", *Polymer*, 2004, 45, pp. 7137-7142.

Gopalan Nair K et al., "Crab Shell Chitin Whisker Reinforced Natural Rubber Nanocomposites. 1. Processing and Swelling Behavior", *Biomacromolecules*, Nov. 3, 2003, vol. 4, pp. 657-665.

Fan et al., "Chitin Nanocrystals Prepared by TEMPO-Mediated Oxidation of α-Chitin", *Biomacromolecules*, Nov. 1, 2008, vol. 9, pp. 192-198.

Japanese Office Action (together with partial English translation) dated Jan. 31, 2012, in corresponding Japanese Patent Application No. 2010-543941.

Partial English translation of JP 2009-102782.

Japanese Office Action (together with partial English translation) dated Jul. 3, 2012 issued in corresponding Japanese Patent Application No. 2010-543941.

Ifuku S et al., Chitin and chitosan research, vol. 14, No. 2, 2008, pp. 138-139.

Fan K et al., Fiber preprints, vol. 63 (2008), No. 1 and 2, (Annual Meeting and Symposium), p. 33.

International Search Report issued Aug. 4, 2009 in corresponding International (PCT) Application No. PCT/JP2009/061929.

* cited by examiner

METHOD FOR PRODUCING CHITIN NANOFIBERS, COMPOSITE MATERIAL AND COATING COMPOSITION EACH CONTAINING CHITIN NANOFIBERS, AND METHOD FOR PRODUCING CHITOSAN NANOFIBERS, COMPOSITE MATERIAL AND COATING COMPOSITION EACH CONTAINING CHITOSAN NANOFIBERS

TECHNICAL FIELD

The present invention relates to a method for producing chitin nanofibers from a material derived from a chitin-containing organism and chitin nanofibers which can be obtained by the method, and a composite material and a coating composition each containing chitin nanofibers. The present invention also relates to a method for producing chitosan nanofibers from a material derived from a chitin-containing organism, and a composite material and a coating composition each containing chitosan nanofibers

BACKGROUND ART

Since nanofibers are generally ultrafine fibers having a diameter (a width) of several tens to several hundreds of nanometers with a feature of having noticeably larger surface area than that of a conventional fiber, nanofibers are focus of attention as those which are novel and exert a special function, and thus utilization thereof has made progress. Polymer materials such as nylon and polyester are mainly used as raw materials of nanofibers. Recently, it has also intensively studied that nanofibers are obtained from biological materials and are utilized from the viewpoint of environmental concerns.

Chitin and chitosan are also derived from organisms, and a study on conversion into nanofibers has been made. For example, there are methods in which a commercially available chitin is converted into nanofibers by fibrillizing and drying using a rotary wet disc grinder (Patent Document 1, Patent Document 2). However, since the commercially available chitin forms a hydrogen bond between fibers, very strongly, it is difficult to completely fibrillized fibers even when physical loads are applied, and thus each fiber has an irregular shape. There are also examples in which chitosan is dissolved in a solvent and nanofibers are spun by electrospinning (Patent Document 3, Non-Patent Document 1). However, it is necessary to dissolve chitosan once in the solvent, and it is not suited for mass production because of huge environmental burdens. Fibers obtained by electrospinning have a large diameter (fiber width of 100 nm or more) and are not uniform. It is difficult to carry out mass production by an electrospinning method, and energy costs are high. Since chitin is insoluble in the solvent, chitin nanofibers cannot be produced by the electrospinning method. There is also a method of obtaining bionanofibers by hydrolysis (Non-Patent Document 2). However, since fibers are cut into pieces by an acid treatment, the fiber length decreases to 1 μm or less. There is also a method in which a commercially available chitin is subjected to an oxidation treatment using a TEMPO catalyst thereby enhancing dispersibility in water, and then nanofibers are fibrillized by an ultrasonic treatment (Non-Patent Document 3). However, in this method, chitin is hydrolyzed by the oxidation treatment and the fiber length largely decreases. The obtained product is akin to a whisker rather than a fiber and also the oxidation treatment is carried out, and thus the product has a chemical structure which is strictly different from that of chitin. There are also methods in which acetic acid is added to chitin derived from squid tendons and the mixture is converted into nanofibers by an ultrasonic treatment (Patent Document 4, Non-Patent Document 4). Since chitin derived from squid is bata-chitin having low crystallinity and is likely to be fibrillized, it is possible to be converted into nanofibers. However, chitin derived from crab and prawn shells is alpha-chitin which has high crystallinity and strong mechanical strength, and thus chitin nanofibers cannot be obtained even when subjected to similar treatment. Furthermore, since squid tendons are overwhelmingly poor in quantity of resources when compared with crab and prawn shells, there is low possibility that the aforementioned method is put into practice.

Shellfishes (Crustacea) such as crab and prawn richly contain chitin in the integument. Moreover, crab and prawn are consumed in a large amount. In almost all cases, these integuments are discarded. Therefore, some trials have been made to obtain chitin from shellfishes thereby producing nanofibers in order to effectively utilize these resources. However, there have never been obtained chitin nanofibers, which are thin and long in a state as it is, and are also homogeneous and excellent in any of crystallinity, physical properties, simplicity of a treatment operation and an accumulation amount, from these organisms.

Uses of nanofibers derived from organism have also been studied and have been put into practice. For example, a coating material utilizing chitosan has been commercialized. However, since chitosan is only soluble in an acidic solution, the coating material utilizing chitosan is not suited for metal. Also, chitosan has high hygroscopicity, and thus the coating material utilizing chitosan must be painted during the summer season in the place where an air conditioner is present.

Patent Document 1: JP-A-2003-155349
Patent Document 2: JP-A-4-281017
Patent Document 3: JP-A-2007-236551
Patent Document 4: JP-A-2009-102782
Non-Patent Document 1: Min B. et al., Polymer, 2004, 45, 7137
Non-Patent Document 2: Gopalan N., et al., Biomacromolecules, 2003, 4, 657
Non-Patent Document 3: Fan Y. et al, Biomacromolecules, 2008, 9, 192.
Non-Patent Document 4: Fan Y. et al, Biomacromolecules, 2008, 9, 1919.

DISCLOSURE OF THE INVENTION

Problems to be Solved by the Invention

It was an object of the present invention to provide chitin nanofibers, which are thin and long, and are also homogeneous and excellent in any of crystallinity, physical properties, simplicity of a treatment operation and an accumulation amount, from a material derived from a chitin-containing organism. It was also an object of the present invention to develop uses of chitin nanofibers. Similarly, it was also an object of the present invention to obtain chitosan nanofibers having excellent properties and to develop uses thereof. For example, it was a specific object of the present invention to develop a coating material in which drawbacks of a conventional chitosan coating material have been overcome.

Means for Solving the Problems

In light of the aforementioned objects, the present inventors have intensively studied and developed a production method to obtain chitin nanofibers, which are thin and long in a scarcely damaged state, and are also homogeneous and excellent in any of crystallinity, physical properties, simplicity of a treatment operation and an accumulation amount, from a material derived from a chitin-containing organism. They have succeeded in the production of a composite material, which causes less thermal expansion than that of a conventional composite material and also maintain light transmittance and flexibility without being lost, by allowing the composite material to contain chitin nanofibers. Furthermore, they have succeeded in the production of a coating composition having excellent adhesiveness by allowing the composite material to contain chitin nanofibers to form a coating film which is more uniform when compared with a conventional one. Also, they have succeeded in the production of chitosan nanofibers having excellent characteristics, and composite material and coating composition each containing chitosan nanofibers from a material derived from a chitin-containing organism.

Effects of the Invention

Chitin nanofibers, which are derived from a material derived from a chitin-containing organism, obtained by the present invention are thin and long, and also homogeneous and excellent in any of crystallinity, physical properties, simplicity of a treatment operation and an accumulation amount. Therefore, chitin nanofibers can be applied to various uses. A composite material containing chitin nanofibers, particularly chitin nanofibers obtained by the present invention causes less thermal expansion than that of a conventional composite material and also maintain light transmittance and flexibility without being lost. A coating composition containing chitin nanofibers, particularly chitin nanofibers obtained by the present invention has excellent adhesiveness since a coating film, which is more uniform than a conventional coating film, is formed. Furthermore, the coating composition of the present invention can be converted into a neutral coating composition. Therefore, the coating composition can also be applied to metal, and also has low hygroscopicity and thus air conditioning is not required in case of painting. Chitosan nanofibers obtained by the present invention, and a composite material and a coating composition each containing the same also have excellent properties.

BEST MODE FOR CARRYING OUT THE INVENTION

Accordingly, the present invention provides the followings.

(1) A method for producing chitin nanofibers, which includes:
subjecting a material derived from a chitin-containing organism to at least one deproteinization step and at least one deashing step, and then
subjecting to a fiber-loosening step.
(2) The method according to (1), which further includes a step of treating with an acidic reagent before the fiber-loosening step.
(3) The method according to (2), wherein the acidic reagent is a weak acid and the pH in said treatment step is from 3 to 4.
(4) The method according to any one of (1) to (3), wherein each step is always carried out without drying.
(5) The method according to any one of (1) to (4), wherein the chitin-containing organism is shellfish.
(6) Chitin nanofibers obtained by the method according to any one of (1) to (5).
(7) The chitin nanofibers according to (6), wherein fibers has a width of 2 nm to 20 nm.
(8) The chitin nanofibers according to (6) or (7), wherein a fiber state is extended-chain crystalline structure.
(9) A composite material including chitin nanofibers and a resin.
(10) The composite material according to (9), wherein a thermal expansion coefficient is decreased to $2 \times 10^{-5}$ °C.$^{-1}$ or less.
(11) The composite material according to (9) or (10), wherein loss of a transmittance at 600 nm is 10% or less when compared with those containing no chitin nanofibers with the same thickness.
(12) The composite material according to any one of (9) to (11), wherein chitin nanofibers are those according to any one of (6) to (8).
(13) A method for producing a composite material, which includes polymerizing a resin monomer in the presence of chitin nanofibers.
(14) The method according to (13), wherein chitin nanofibers are those according to any one of (6) to (8).
(15) A coating composition including chitin nanofibers and a water-soluble resin or emulsion.
(16) The coating composition according to (15), which is used for metal.
(17) The coating composition according to (15) or (16), wherein chitin nanofibers are those according to any one of (6) to (8).

(18) A method for producing a coating composition, which includes blending a water suspension of chitin nanofibers with a water-soluble resin or emulsion.
(19) The method according to (18), wherein chitin nanofibers are those according to any one of (6) to (8).
(20) A method for producing chitosan nanofibers, which includes:
subjecting a material derived from a chitin-containing organism to at least one deproteinization step and at least one deashing step, and at least one deacetylation step, and then,
subjecting to a fiber-loosening step.
(21) The method according to (20), wherein each step is always carried out without drying.
(22) Chitosan nanofibers obtained by the method according to (20) or (21).
(23) The chitosan nanofibers according to (22), wherein fibers has a width of 2 nm to 40 nm.
(24) A coating composition including chitosan nanofibers and a water-soluble resin or emulsion.
(25) The coating composition according to (24), wherein chitosan nanofibers are those according to (23).
(26) A method for producing a coating composition, which includes blending a water suspension of chitosan nanofibers with a water-soluble resin or emulsion.
(27) The method according to (26), wherein chitosan nanofibers are those according to (23).

The present invention provides, in an aspect, a method for producing chitin nanofibers, which includes:
subjecting a material derived from a chitin-containing organism to at least one deproteinization step and at least one deashing step, and then
subjecting to a fiber-loosening step.

Chitin nanofibers of the present invention can be obtained from a material derived from a chitin-containing organism. Examples of the chitin-containing organism include, but are not limited to, shellfishes (Crustacea), insects (Insecta), krill and the like. Examples of the material derived from a chitin-containing organism used as a raw material of chitin nanofibers of the present invention include integuments of insects (Insecta), shells of krill, shells and integuments of shellfishes (Crustacea) and the like. The material derived from a chitin-containing organism is preferably an organism having high chitin content, for example, shells and integuments of shellfishes such as crab and prawn. Carapaces and shells of crab, prawn and the like occupy almost all of portions to be discarded after consumption. Moreover, since crab and prawn are consumed in a large amount, a large amount of integuments of crab and prawn can be obtained, and it is convenient.

Chitin nanofibers in the living body cannot be obtained unless subject to a matrix removing treatment since chitin nanofibers contain a matrix containing protein and calcium carbonate, which exists in the periphery and gap. According to the method for producing chitin nanofibers of the present invention, it is possible to isolate and extract chitin nanofibers in the living body in a state as they are. Therefore, chitin nanofibers obtained by the production method of the present invention are thin, homogeneous and long, and also have molecules composed of an extended-chain crystalline structure and have a high strength. The extended-chain crystalline structure means a fiber-like crystal in which stiff polymers are regularly arranged in an extended-chain crystallite to form a bundle, and can exhibit tough physical properties because of less defects. Since chitin of shellfishes such as crab and prawn is alpha-chitin having particularly high crystallinity, chitin nanofibers obtained using, as raw material, shells of shellfishes such as crab and prawn in the present invention remarkably exhibits the aforementioned excellent characteristics.

A protein, which surrounds chitin nanofibers to form a matrix, is removed by deproteinization. An alkali treatment method, a method using a proteolytic enzyme such as protease and the like are exemplified as a method for a deproteinization treatment, and the alkali treatment method is suitable. In the deproteinization by the alkali treatment, an aqueous solution of an alkali such as potassium hydroxide, sodium hydroxide or lithium hydroxide is preferably used, and the concentration can be appropriately selected according to the amount of a material derived from a chitin-containing organism, the kind of a chitin-containing organism, the site and the like, but is usually from about 2 to about 100 (w/v), and preferably from about 3 to about 7% (w/v), for example, about 5% (w/v). The temperature of the deproteinization by the alkali treatment can be appropriately selected according to the amount of a material derived from a chitin-containing organism, the kind of a chitin-containing organism, the site and the like, and is usually about 80° C. or higher, and preferably about 90° C. or higher. Still more preferably, the deproteinization is carried out while refluxing an aqueous alkali solution. The treatment time can also be appropriately selected according to the amount of a material derived from a chitin-containing organism, the kind of a chitin-containing organism, the site and the like, and the deproteinization may be usually carried out for several hours to about 3 days, and preferably several hours to about 2 days.

An ash component surrounding chitin nanofibers, mainly calcium carbonate is removed by deashing. An acid treatment method, an ethylenediaminetetraacetic acid treatment method and the like are exemplified as a method for a deashing treatment, and the acid treatment method is suitable. In the deashing by the acid treatment, an aqueous solution of an acid such as hydrochloric acid is preferably used, and the concentration can be appropriately selected according to the amount of a material derived from a chitin-containing organism, the kind of a chitin-containing organism, the site and the like, and is usually from about 4 to about 12% (w/v), and preferably from about 5 to about 10% (w/v). The temperature of the deproteinization by the acid treatment can be appropriately selected according to the amount of a material derived from a chitin-containing organism, the kind of a chitin-containing organism, the site and the like, and is usually from about 10 to about 50° C., and preferably from about 20 to about 30° C., for example, room temperature. The deashing time by the acid treatment can also be appropriately selected according to the amount of a material derived from a chitin-containing organism, the kind of a chitin-containing organism, the site and the like, and the deashing may be usually carried out for several hours to several days, and preferably from about 1 to about 3 days, for example, 2 days.

Next, the integument (almost thereof is converted into chitin nanofibers) obtained in the aforementioned steps is subjected to a fiber-loosening treatment to obtain the objective chitin nanofibers. Since chitin nanofibers undergo hydrogen bonding and strongly aggregate when dried, each step of the method for producing chitin nanofibers of the present invention is preferably carried out without always drying materials. In the fiber-loosening treatment, devices such as a stone mill type triturating machine, a high-pressure homogenizer and a freezed crushing machine can be used, and a grinder treatment is preferably carried out by the stone mill type triturating machine. When a device capable of applying a stronger load such as the stone mill type triturating machine is used, even alpha-chitin derived from shells of prawn and crab can be quickly fibrillized. Thereafter, the obtained chitin nanofibers may be dispersed in an aqueous medium such as water.

In the aforementioned method for producing chitin nanofibers, a decoloration step may be carried out, if necessary, or if desired. The decoloration step may be carried out at any stage of the aforementioned method, and is preferably carried out after completion of the deproteinization and deashing treatment. The decoloration may be carried out by any method, and it is preferred to use a chlorine-based bleaching agent, an oxygen-based bleaching agent or a reducing bleaching agent. The decoloration may be carried out in a buffer solution, for example, an acetate buffer solution at about 70 to about 90° C. for several hours using about 1 to about 2% sodium hypochlorite.

Furthermore, a crushing step may be carried out so as to efficiently carry out a deproteinization step, a deashing treatment step, a decoloration step, a fiber-loosening step, and a treatment with an acidic reagent explained hereinafter. The crushing step may be carried out at any stage of the aforementioned method, and is preferably carried out immediately before the fiber-loosening step. Although the crushing step may be carried out by any method, a homogenizer treatment method and a mixer treatment method are preferable and, for example, the crushing step may be carried out by a domestic food processor.

The aforementioned steps such as deproteinization step, deashing treatment step, decoloration step and crushing step may be carried out repeatedly, plural times, or alternately. Each step may be carried out in any order.

Furthermore, water dispersibility of chitin nanofibers may be improved by treating the deashed chitin-containing material using an acidic reagent, if necessary, or if desired. There is no particular limitation on the treating method using the acidic reagent, and the method may be a method of impregnating the material with the acidic reagent. The treatment with the acidic reagent can be typically carried out by immersing the deashed chitin-containing material in an aqueous solution of an acid. In this step, not only water dispersibility can be improved, but also dispersion in a fiber width (or a fiber diameter) of chitin nanofibers can be suppressed. The acid which can be used in this step may be any acid and is not particularly limited, and is preferably a weak acid. Examples of the weak acid include, but are not limited to acetic acid, formic acid, chloroacetic acid, fluoroacetic acid, propionic acid, butyric acid, lactic acid, citric acid, malonic acid, ascorbic acid and the like. The weak acid used in this step is preferably acetic acid. In this step, the pH of an aqueous solution of the weak acid is usually adjusted in a range from about 2 to about 5, and preferably from about 2.5 to about 4.5, for example, about 3 to about 4. The temperature of this step can be appropriately selected according to the amount of a material derived from a chitin-containing organism, the kind of a chitin-containing organism, the site and the like, and may be usually from about 10 to about 50° C., and preferably from about 20 to about 30° C., for example, room temperature. The treatment time of this step can also be appropriately selected according to the amount of a material derived from a chitin-containing organism, the kind of a chitin-containing organism, the site and the like, and may be usually from 1 hour to about 1 day, and preferably from about 3 to about 12 hours, for example, overnight. The treatment step using this acid may be carried out at any stage before the fiber-loosening step, and may be preferably carried out at a stage where purification of chitin nanofibers has proceeded to some degree after the deproteinization and deashing and, for example, the treatment step may be carried out immediately before the fiber-loosening step.

The present invention provides, in another aspect, chitin nanofibers obtained by the aforementioned production method. As mentioned above, according to the production method of the present invention, it is possible to isolate and extract chitin nanofibers in the living body in a state as they are, and chitin nanofibers obtained by the production method of the present invention is thin and homogeneous, and also very long and fibers are composed of an extended-chain crystalline structure and have a high strength. Therefore, chitin nanofibers obtained by the production method of the present invention are excellent in any of physical properties, simplicity of a treatment operation and an accumulation amount. Accordingly, chitin nanofibers can be applied to various uses. The width (or the diameter) of chitin nanofibers obtained by the present invention is usually from about 2 nm to about 30 nm, and preferably from about 2 nm to about 20 nm, for example, 5 nm to 20 nm. Herein, for example, "the width (or the diameter) of chitin nanofibers is from about 2 nm to about 20 nm" refers to a state where, in the case of observing using an electron microscope, fibers having a width (or a diameter) of about 2 nm to about 20 nm or less account for about 50% or more, preferably about 60% or more, and still more preferably about 70% or more of the entirety. Furthermore, the same shall apply to the width (or the diameter) of chitosan nanofibers mentioned hereinafter.

Chitin nanofibers have high crystallinity and therefore have excellent physical properties which are not recognized in other nanofibers. As mentioned above, carapaces and shells of shellfishes, particularly crab and prawn are discarded in a large amount, and it is an environmentally friendly technology to obtain useful chitin nanofibers from them, and also it is useful from the viewpoint of costs. Furthermore, as mentioned above, chitin nanofibers obtained by the present invention have excellent physical properties. Therefore, according to the present invention, these excellent physical properties of chitin nanofibers obtained by the present invention are applied to resins and coating materials.

Accordingly, the present invention provides, in still another aspect, a composite material containing chitin nanofibers and a resin, and a method for producing the same. Although chitin nanofibers used in the composite material of the present invention and the method for producing the same are not particularly limited, chitin nanofibers obtained by the method of the present invention explained above are preferable. Chitin nanofibers produced by the method of the present invention have high strength, flexibility, and comparatively narrow width (or diameter) which is usually from about 2 nm to about 30 nm, and preferably about 2 nm to about 20 nm since a fiber state is an extended-chain chitin chain crystal. Therefore, in the case of using chitin nanofibers obtained by the method of the present invention, the obtained composite material is more reinforced and also has increased flexibility and improved light permeability (transparency). These features are particularly advantageous in case the composite material is a plastic. The composite material generally refers to a material in which two or more kinds of base material are integrated with each other using in combination. The composite material in the present invention may be any kind of a composite material as long as it is a composite material in which chitin nanofibers are used in combination with the other base material, and a plastic or resin containing chitin nanofibers, a combination of chitin nanofibers and a biomaterial, mixing of chitin nanofibers in a paper, a combination of chitin nanofibers and natural or synthetic fibers and the like are exemplified.

The composite material containing chitin nanofibers of the present invention can be produced by mixing chitin nanofibers with the other material thereby integrating with each other. The other material can be appropriately selected according to the use of a composite material, required physical properties and the like, and may be either a natural material or an artificial material. The method of mixing chitin nanofibers with the other material thereby integrating with each other may also be a known method in the relevant field, and can be appropriately selected. The case of producing a plastic as an example of the composite material of the present invention will be described below. The chitin nanofiber-containing plastic of the present invention can be produced by polymerizing a resin monomer in the presence of chitin nanofibers. The kind of a resin monomer and the kind of a polymerization initiator can be appropriately selected by a person with an ordinary skill in the art. Examples of the resin monomer which can be used in the production of the plastic of the present invention include, but are not limited to, a monoacrylate-based monomer, a diacrylate-based monomer, a triacrylate-based monomer, a monomethacrylate-based monomer, a dimethacrylate-based monomer, a trimethacrylate-based monomer, an epoxy resin-based monomer, a phenol resin-based monomer, a melamine resin-based monomer, a polyester-based monomer, a polyimide-based monomer and the like. Examples of the polymerization initiator which can be used in the production of the composite material of the present invention include, but are not limited to, 1-hydroxycyclohexyl-phenyl ketone, 2-hydroxy-2-methyl-phenylpropan-1-one, azobisisobutyronitrile, benzoyl peroxide and the like. The proportions of the chitin nanofibers, the resin monomer and the polymerization initiator can be appropriately selected according to required properties such as strength, flexibility and transparency of the plastic. Specific procedure of the production of the chitin nanofiber-containing plastic of the present invention will be exemplified. First, an aqueous suspension of chitin nanofibers is dehydrated by a known method such as filtration, compression or drying and formed into a desired shape (for example, sheet, film, etc.). The means and method for filtration, compression or drying used in this step are also known. Next, chitin nanofibers formed into a desired shape are immersed in a resin monomer containing a polymerization initiator. In this step, the resin monomer containing the polymerization initiator is injected into chitin nanofibers. In this injection step, injection of the resin monomer may be accelerated by reducing the pressure. Then, the polymerization initiator in chitin nanofibers, into which the resin monomer is injected, is reacted, and thus a plastic can be obtained. The polymerization reaction conditions can be appropriately selected according to the kinds of a resin monomer and a polymerization initiator, and the shape and the size of a desired plastic. While a sheet and a film were exemplified as the shape of the plastic of the present invention in the aforementioned description, it is also possible to form into other shapes such as a powder, a fiber, a rod, a block, a sponge and a pellet using a known means and method. Furthermore, the plastic of the present invention may appropriately contain additives (for example, a flame retardant, a plasticizer, a filler and reinforcer, a lightness-imparting agent, a nucleating agent, a curing agent, an impact resistance-imparting agent, a coupling agent, a blowing agent, a coloring agent, an antioxidant, a photostabilizer, an ultraviolet absorber, an antistatic agent, a conductivity-imparting agent, an antibacterial and antifungal agent, an anti-fogging agent, a lubricant, a heavy metal inactivator, etc.) and coloring agents for the purpose of modification and imparting of functions.

As mentioned above, the chitin nanofiber-containing composite material of the present invention is reinforced when compared with those containing no chitin nanofibers. The chitin nanofiber-containing composite material obtained by the present invention may have decreased thermal expandability. Although depending on the content of chitin nanofibers, it is possible to obtain those in which a thermal expansion coefficient is decreased, for example, to $50 \times 10^{-5}/°$ C. or lower, preferably about $30 \times 10^{-5}/°$ C. or lower, more preferably about $10 \times 10^{-5}/°$ C. or lower, and still more preferably about $2 \times 10^{-5}/°$ C. or lower. The thermal expandability of the chitin nanofiber-containing composite material obtained by the present invention can be measured using known means, for example, a thermomechanical analysis apparatus (TMA). In the chitin nanofiber-containing composite material obtained by the present invention, not only the strength but also the flexibility is enhanced in reflection of properties of chitin nanofibers.

The chitin nanofiber-containing composite material obtained by the present invention causes less deterioration of light permeability (transparency) when compared with the case of a composite material containing no chitin nanofibers. It is possible to obtain a composite material, which causes particularly less deterioration of light permeability (transparency), by producing a composite material using a resin having a refractive index which is the same as or similar to that of chitin. Examples of the resin having a refractive index which is the same as or similar to that of chitin include, but are not limited to, tricyclodecanemethanol dimethacrylate, ethoxylated bisphenol A dimethacrylate, ethoxylated bisphenol A dimethacrylate and the like. Although depending on the kind of a resin and the content of chitin nanofibers, the chitin nanofiber-containing composite material obtained by the present invention has a linear transmittance in visible light of, for example, about 70% or more, preferably about 75% or more, more preferably about 80% or more, and still more preferably 85% or more. The linear transmittance in visible light of the chitin nanofiber-containing composite material obtained by the present invention can be measured using, for example, an ultraviolet and visible spectrophotometer. Although depending on the kind of a resin, the content of chitin nanofibers and the thickness of a composite material, the chitin nanofiber-containing composite material obtained by the present invention has loss of a transmittance of visible light, for example, loss of a light transmittance at 600 nm of, for example, about 10% or less, preferably about 51 or less, and still more preferably about 2% or less, when compared with a composite material containing no chitin nanofibers with the same thickness. The transmittance of light at a specific wavelength of the chitin nanofiber-containing composite material obtained by the present invention can also be measured using, for example, an ultraviolet and visible spectrophotometer.

Therefore, the composite material of the present invention is suited for use which requires the strength and transparency, and can be particularly used in place of a plastic which has conventionally been used. Typical examples of the use thereof include, but are not limited to, various daily necessities; outside portions and parts of electronic equipment such as a cellular phone, a personal computer or a lighting equipment; bodies of vehicles such as an automobile, a vessel and an aircraft; and sporting goods such as a racket, a golf club and a fishing rod and the like.

The present invention also provides a coating composition containing chitin nanofibers and a water-soluble resin or emulsion, and a method for producing the same. Although chitin is insoluble in various solvents, chitin nanofibers have high dispersibility in a solvent and therefore can be applied to the coating composition. Chitin nanofibers used in the coating composition of the present invention and the method for producing the same are preferably chitin nanofibers produced by the production method of the present invention. Chitin nanofibers produced by the production method of the present invention are homogeneous and the width (or the diameter) is usually about 2 nm to about 30 nm (preferably about 2 nm to about 20 nm) and therefore exert a large nanosize effect and have extremely high dispersibility in a solvent, and thus chitin nanofibers are suited for use in the coating composition.

Chitin nanofibers have cation chargeability and are excellent in metal adsorptivity, pigment adsorptivity, antibacterial properties, solvent resistance and film-forming properties, and also have excellent reactivity. It is therefore considered that the coating composition containing chitin nanofibers and a water-soluble resin or emulsion obtained by the production method of the present invention has novel functionality which has never existed. Furthermore, the coating composition containing chitin nanofibers and a water-soluble resin or emulsion obtained by the production method of the present invention forms a uniform coating film and has excellent adhesion to various coated objects.

Furthermore, a water-soluble resin or emulsion having compatibility with a cationic polymer, like chitosan, was very rare and very disadvantageous as the composition of a coating material. On the other hand, chitin nanofibers are akin to a neutral polymer and therefore can be mixed with various resins. Since the chitosan-containing coating material, which has already been commercialized, is only soluble in an acidic coating material (chitosan is only soluble in an acidic solution), the coating material is not generally suited for painting on a surface of metal. Also regarding painting on the wood portion of building materials and furnitures, use of the coating material was avoided in case metal such as nail is composited. On the other hand, use of chitin nanofibers enables to form into a coating composition under neutral conditions, and thus painting on metal became easy. Accordingly, the coating composition of the present invention can also be used for metal.

Since the chitosan coating material, which has already been commercialized, has extremely high hygroscopicity and water droplets are formed on a surface of a coating film under a high humidity atmosphere (blushing phenomenon), it was necessary to carry out painting in a paint booth equipped with an air conditioner in the season with high humidity, such as summer season. On the other hand, since chitin nanofibers have lower polarity than that of chitosan and have high crystallinity, hygroscopicity is not so high when compared with chitosan. Therefore, the coating composition of the present invention does not require such an air conditioner.

Examples of a common method for producing a coating composition containing chitin nanofibers of the present invention and a water-soluble resin or emulsion include a method including the step of blending a water suspension of chitin nanofibers obtained by the production method of the present invention with a water-soluble resin or emulsion. The blending step can be carried out by a known method, for example, a method for treatment such as mixing, intimate mixing, stirring, ultrasonic treatment, dispersion or supercritical. The water-soluble resin and emulsion to be blended are not particularly limited as long as they are a water-soluble synthetic resin, a natural water-soluble resin, a synthetic resin emulsion and a natural resin emulsion, which can be mixed with a water suspension of chitin nanofibers or have compatibility. Examples of the water-soluble synthetic resin which can be used in the production of the coating composition of the present invention include, but are not limited to, polyvinyl alcohol, polyethylene glycol, polypropylene glycol, polyethylene glycol diglycidyl ether, polypropylene glycol diglycidyl ether, polyethyleneimine, polyallylamine, polyaminesulfone, polyacrylic acid, sodium polyacrylate, acrylic acid-maleic acid copolymer salt, acrylic acid-sulfonic acid-based monomer copolymer salt and the like. Examples of the natural water-soluble resin which can be used in the production of the coating composition of the present invention include, but are not limited to, chitosan derivatives such as chitosan, carboxymethylchitosan, hydroxymethylchitosan, hydroxyethylchitosan and hydroxypropylchitosan; cellulose derivatives such as carboxymethyl cellulose, hydroxyethyl cellulose, hydroxypropylmethyl cellulose and methyl cellulose; alginates such as dextran, pullulan, sodium alginate and potassium alginate, calcium alginate and ammonium alginate; chondroitinsulfuric acid, tannic acid, carrageenan, pectin, gum arabic, guar gum, locust bean gum, tamarind gum, xanthan gum, curdlan, collagen, fucoidan, polyglutamic acid, polylysine and the like. Examples of the synthetic resin emulsion which can be used in the production of the coating composition of the present invention include, but are not limited to, a vinyl acetate homopolymer-based emulsion, a vinyl acetate-acrylic copolymer-based emulsion, an ethylene-vinyl acetate copolymer-based emulsion, an acrylic emulsion, an acrylic-styrene-based emulsion and the like; and a urethane, silicone, fluorinated monomer or prepolymer copolymer thereof. Examples of the natural resin emulsion which can be used in the production of the coating composition of the present invention include, but are not limited to, a gum rosin-based emulsion, a wood rosin-based emulsion, a tall oil rosin-based emulsion, a terpene resin-based emulsion, a shellac resin-based emulsion, a casein-based emulsion, a copal rubber-based emulsion, a carnauba wax-based emulsion, a tragacanth gum-based emulsion and the like. The conditions such as the kind of a water-soluble resin or emulsion, the blending ratio of chitin nanofibers and a water-soluble resin or emulsion, the blending temperature and blending time can be appropriately selected by a person with an ordinary skill in the art.

Furthermore, in the aforementioned production method, it is possible to obtain a film having high transparency, which is transparent and is excellent in light guiding properties, after the formation of a coating film by selecting a blending resin or emulsion having a refractive index which is the same as or similar to that of chitin. Examples of the blending resin having a refractive index which is the same as or similar to that of chitin include, but are not limited to, polystyrene, an acrylic-styrene copolymer, and a urethane, silicone, fluorine monomer or prepolymer copolymer thereof. Examples of the emulsion having a refractive index which is the same as or similar to that of chitin include, but are not limited to, a styrene-based emulsion, an acrylic-styrene-based emulsion, and a urethane, silicone, fluorinated monomer or prepolymer copolymer thereof. Furthermore, it is possible to obtain a film having high transparency, which is transparent and is excellent in strength as well as light guiding and scattering properties, after the formation of a coating film by selecting blending organic resin beads or inorganic powders having a refractive index which is the same as or similar to that of chitin. Examples of the blending resin beads having a refractive index which is the same as or similar to that of chitin include, but are not limited to, an acrylic resin, a styrene resin, an acrylic-styrene copolymer, and a urethane, silicone, fluorinated monomer or prepolymer copolymer thereof. Examples of the inorganic powders having a refractive index which is the same as or similar to that of chitin include, but are not limited to, crushed glass, quartz, mica and the like.

For the purpose of coloring the resin composition of the present invention, a pigment may be added. Examples of the pigment to be added include, but are not limited to, inorganic pigments typified by natural inorganic pigments, synthetic inorganic pigments and ceramic pigments, for example, zinc oxide, white lead, lithopone, titanium dioxide, sedimentary barium sulfate and baryte powder, red lead, red iron oxide, lead yellow and chrome yellow [1], zinc yellow (zinc potassium chromate, zinc tetroxy chromate), ultramarine blue, Prussian blue (potassium ferric ferrocyanide), carbon black, carbon black zircon gray, praseodymium yellow, chrome titan yellow, chrome green, peacock, victoria green, Berlin blue, vanadium zircon blue, chrome tin pink, manganese pink, salmon pink and the like. Alternately, examples of the pigment which may be added include, but are not limited to, organic pigments typified by azo-based pigments and polycyclic pigments, for example, anthraquinone, quinacridon, diketo-pyrrolo-pyrrole, perylene, indigoid, perinone, perylene, pyrazolone, pyranthrone, imidazolone, diketo-pyrrolo-pyrrole, quinophthalone, isoindolinone, pyrazolone, imidazolone, furabatoron, phthalocyanine, perylene, nitroso, carbonium, phthalocyanine, anthraquinone, indigoid, carbonium, quinacridon, dioxazine, anthraquinone, perylene, imidazolone, indigoid, xanthene, carbonium, biolanthrone and the like.

In a sense of an increase in quantity, so-called extender pigments such as calcium carbonate, talc and perlite may be added to the coating composition of the present invention. Furthermore, additives such as a dispersing agent, a thickener, a defoamer, a leveling agent and a suspending agent may be appropriately added to the coating composition of the present invention.

The present invention provides, in another aspect, a method for producing chitosan nanofibers, which includes subjecting a material derived from a chitin-containing organism to at least one deproteinization step and at least one deashing step, and at least one deacetylation step, and then subjecting to a fiber-loosening step. The deproteinization step, the deashing step and the fiber-loosening step are the same as those mentioned above with respect to the production of chitin nanofibers. In the present invention, it is also possible to simultaneously carry out the deproteinization step and the deacetylation step. Furthermore, it is also possible to produce chitosan nanofibers by subjecting a commercially available chitin powder, which has already been subjected to the deproteinization step and the deashing step, to the deacetylation step. Some deacetylation methods are known, an alkali treatment method is suitable. In the deacetylation by the alkali treatment, an aqueous solution of an alkali such as potassium hydroxide, sodium hydroxide or lithium hydroxide is preferably used, and the concentration is usually from about 20 to about 500 (w/v), and preferably about 30 to about 400 (w/v), for example, about 40% (w/v). The temperature of the deacetylation by the alkali treatment can be appropriately selected according to the amount of a material derived from a chitin-containing organism, the kind of a chitin-containing organism, the site and the like, and is usually about 80° C. or higher, and preferably about 90° C. or higher. Still more preferably, the deacetylation is usually carried out while refluxing an aqueous alkali solution. The treatment time can be also appropriately selected according to the amount of a material derived from a chitin-containing organism, the kind of a chitin-containing organism, the site and the like, and the treatment may be usually carried out for 30 minutes to about 3 days, and preferably 30 minutes to overnight. Since chitin nanofibers undergo hydrogen bonding and strongly aggregate when dried, it is extremely preferred that each step of the method for producing chitin nanofibers of the present invention is carried out without always drying materials.

The present invention provides, in still another aspect, a composite material containing chitosan nanofibers and a plastic including a resin, and a coating composition containing chitosan nanofibers and a water-soluble resin or emulsion, such as paint. Chitosan nanofibers used in such a composite material and the coating composition may be any chitosan nanofibers and are not particularly limited. However, chitosan nanofibers produced by the method of the present invention have high strength, flexibility, and comparatively narrow width (or diameter) since a fiber state is extended-chain crystalline structure. Therefore, chitosan nanofibers can be preferably used in the composite material and the coating composition of the present invention. The width (or the diameter) of chitosan nanofibers produced by the aforementioned production method of the present invention is usually from about 2 nm to about 40 nm. The composite material containing chitosan nanofibers obtained by the aforementioned production method of the present invention has increased strength when compared with those containing no chitosan nanofibers, and thus those having high transparency can be obtained. Examples of the composite material containing chitosan nanofibers of the present invention include a plastic and the like. Uses of the composite material containing chitosan nanofibers of the present invention are the same as those mentioned above with respect to the composite material containing chitin nanofibers. The coating composition containing chitosan nanofibers obtained by the aforementioned production method of the present invention forms a uniform coating film and has excellent adhesion to various coated objects.

The present invention provides, in still another aspect, a method for producing a composite material containing chitosan nanofibers and a resin, and a method for producing a coating composition containing chitosan nanofibers and a water-soluble resin or emulsion. These production methods are the same as the aforementioned method for producing a composite material containing chitin nanofibers and a resin and method for producing a coating composition containing chitin nanofibers and a water-soluble resin or emulsion, except that chitosan nanofibers are used in place of chitin nanofibers.

The present invention will be described in more detail and specifically by way of examples, but it is to be understood that the present invention is not limited to the examples. Unless otherwise specified, percentages in the example are by weight and volume.

EXAMPLE 1

Production of (1) of Chitin Nanofibers from Prawn Shells

Dried prawn shells (produced in Canada, purchased from Kawai Hiryo, 100 g) were added to an aqueous 5% KOH solution and a protein in prawn shells was removed by refluxing for 6 hours. The treated prawn shells were filtered and then well washed with water until neutral. The prawn shells were stirred in an aqueous 7% HCl solution at room temperature for 2 days to remove an ash component in the prawn shells. Again, the prawn shells were filtered and well washed with water until neutral. The treated prawn shells were added to a 0.3 M sodium acetate buffer solution of 1.7% NaClO$_2$ and a pigment component contained in the prawn shells was removed by stirring at 80° C. for 6 hours. Again, the prawn shells were filtered and well washed with water until neutral. The prawn shells were dispersed in water and the obtained dispersion was crushed by a domestic mixer and the pH was adjusted in a range of 3 to 4 by adding acetic acid, followed by stirring overnight. The prawn shells treated with acetic acid were fibrillized into chitin nanofibers by a stone mill type triturating machine (Supermasscolloider (MKCA 6-2)). A yield of chitin nanofibers was 12%. The substitution degree of an N-acetyl group of chitin nanofibers obtained by elemental analysis was 95%.

Figure 1:
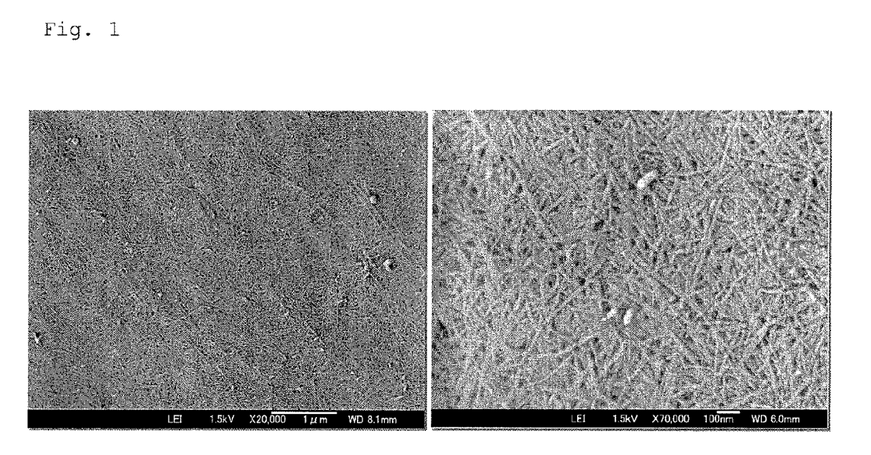
FIG. 1 is a micrograph of chitin nanofibers derived from crab shells obtained by the method of the present invention taken using a scanning electron microscope (FE-SEM). The left micrograph is a micrograph at 20,000 times magnification, while the right micrograph is a micrograph at 70,000 times magnification.
Figure 2:
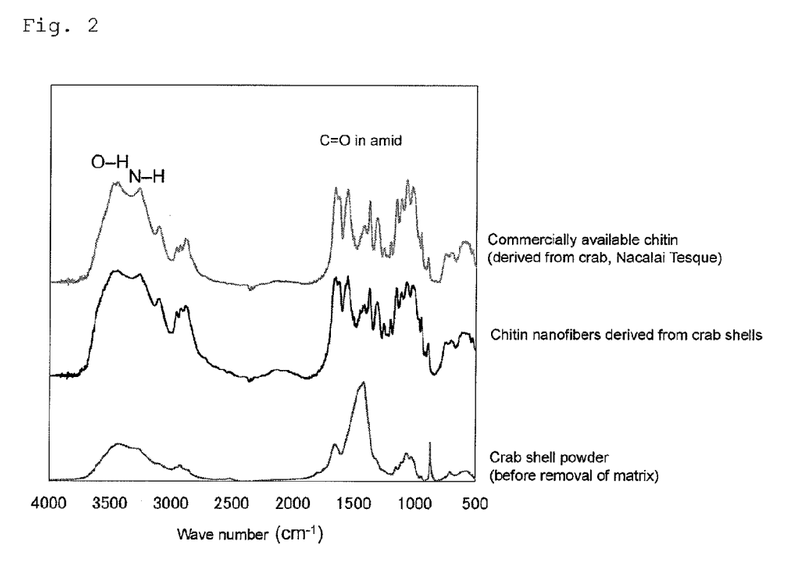
FIG. 2 is a graph showing spectra of chitin nanofibers derived from crab shells obtained the method of the present invention, taken using an infrared spectrophotometer (FT-IR).
Figure 3:
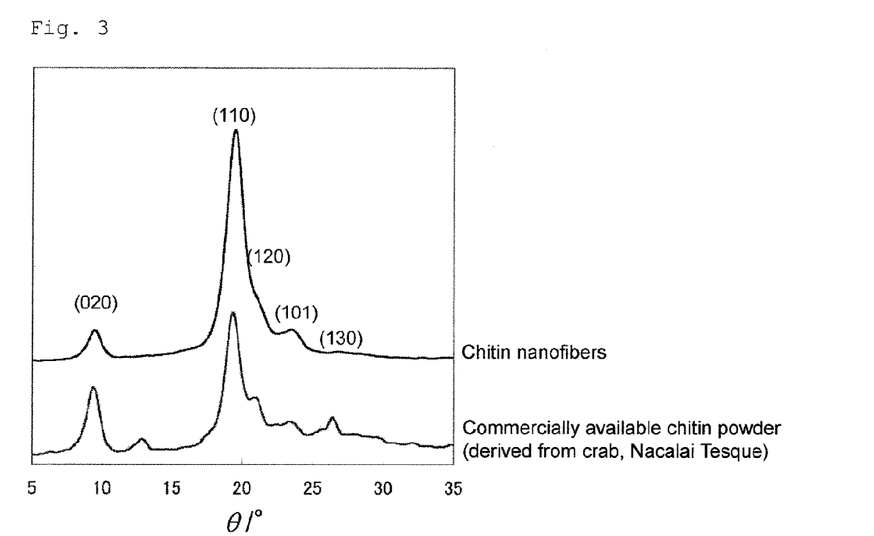
FIG. 3 is a graph showing X-ray diffraction patterns of chitin nanofibers derived from crab shells obtained by the method of the present invention, taken using an X-ray scattering measurement device.

The obtained chitin nanofibers were observed by a scanning electron microscope (FE-SEM) (JSM-6700F, JEOL). In almost all of the fibers, a lot of very thin and long homogeneous nanofibers having a width of about 20 nm or less (a width of about 10 nm) were recognized (FIG. 1). Using an infrared spectrophotometer (FT-IR), the obtained nanofibers were evaluated. The results revealed that the obtained nanofibers are made of purified chitin which contains neither a protein nor a calcium carbonate component (FIG. 2). Using X-ray scattering measurement device (XRD6000, Shimadzu), the obtained chitin nanofibers were evaluated. The results revealed that the obtained chitin nanofibers are a-type crystalline nanofibers (FIG. 3).

EXAMPLE 2

Production of (2) of Chitin Nanofibers from Crab Shells

Dried crab shells (produced in Canada, purchased from Kawai Hiryo, 100 g) were added to an aqueous 5% KOH solution and a protein in crab shells was removed by refluxing for 6 hours. The treated crab shells were filtered and then well washed with water until neutral. The crab shells were stirred in an aqueous 7% HCl solution at room temperature for 2 days to remove an ash component in the crab shells. Again, the prawn shells were filtered and well washed with water until neutral. The crab shells were added to an aqueous 5% KOH solution and a protein in the crab shells was removed by refluxing for 2 days. The treated crab shells were added to a 0.3 M sodium acetate buffer solution of 1.7% $NaClO_2$ and a pigment component contained in the crab shells was removed by stirring at 80° C. for 6 hours. Again, the crab shells were filtered and well washed with water until neutral. The crab shells were dispersed in water and the obtained dispersion were crushed by a domestic mixer and the pH was adjusted in a range of 3 to 4 by adding acetic acid, followed by stirring overnight. The crab shells treated with acetic acid were fibrillized into chitin nanofibers by a stone mill type triturating machine (Supermasscolloider (MKCA 6-2)). The obtained chitin nanofibers were converted into a 1% chitin nanofiber water dispersion. A yield of chitin nanofibers was 12.1%.

EXAMPLE 3

Production of Chitin Nanofibers from Prawn Shells

Figure 4:
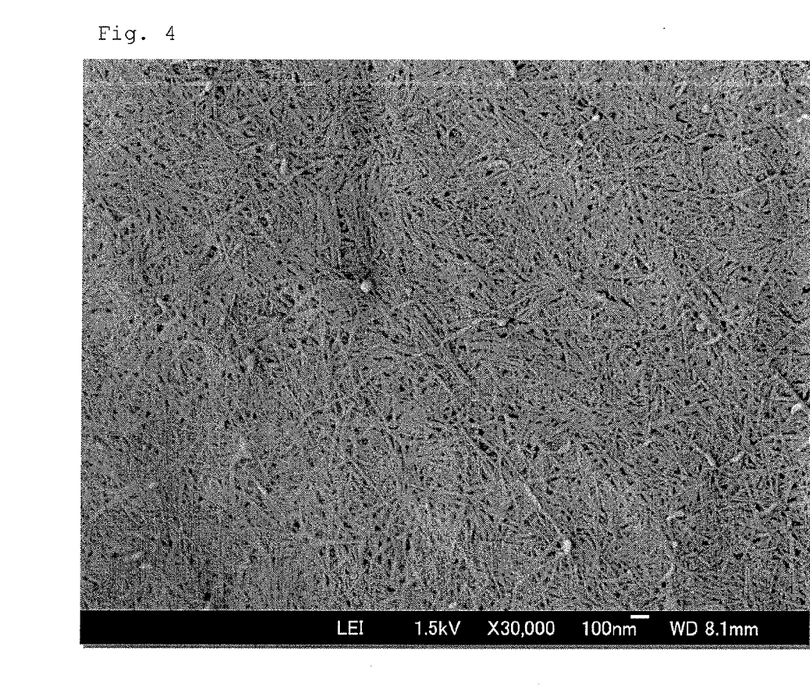
FIG. 4 is a micrograph of chitin nanofibers derived from prawn shells obtained by the method of the present invention, taken using a scanning electron microscope (FE-SEM). The magnification is 30,000 times.

Shells (10 g) of fresh black tiger prawns were added to an aqueous 5% KOH solution and a protein in prawn shells was removed by refluxing for 6 hours. The treated prawn shells were filtered and then well washed with water until neutral. The prawn shells were stirred in an aqueous 7% HCl solution at room temperature for 2 days to remove an ash component in the prawn shells. Again, the prawn shells were filtered and well washed with water until neutral. The treated prawn shells were added to a 0.3 M sodium acetate buffer solution of 1.7% $NaClO_2$ and a pigment component contained in the prawn shells was removed by stirring at 80° C. for 6 hours. Again, the prawn shells were filtered and well washed with water until neutral. The prawn shells were dispersed in water and the obtained dispersion was crushed by a domestic mixer, and then the prawn shells were fibrillized into chitin nanofibers by a stone mill type triturating machine (Supermasscolloider (MKCA 6-2)). A yield of chitin nanofibers was 16.7%. The obtained chitin nanofibers were observed by a scanning electron microscope (FE-SEM) (JSM-6700F, JEOL). In almost all of the fibers, a lot of very thin and long homogeneous nanofibers having a width of about 20 nm or less (a width of about 10 nm) were recognized (FIG. 4).

EXAMPLE 4

Production of Chitin Nanofiber-Containing Composite Material

A water suspension of 0.7% chitin nanofibers (obtained in Example 1) was filtered and the obtained sheet-like molded article was interposed between wire mesh sheets having a small mesh, followed by application of a weight and further drying at 80° C. overnight. The dried chitin nanofiber sheet was cut into a piece measuring 2 cm×3 cm, followed by immersion in a dimethacrylate resin monomer (NK ester DCP (manufactured by SHIN-NAKAMURA CHEMICAL CO., LTD.)) (refractive index n: 1.556) containing a 5% polymerization initiator (2-hydroxy-2-methylpropiophenone) added therein and further vacuum injection under 5 mmHg or less overnight. The chitin nanofiber sheet containing the resin monomer injected therein was taken out and interposed between slide glasses and then the resin was cured using a UV irradiation device (Spot-Cure, manufactured by Ushio Inc.). Irradiation energy was set at 20 J/cm². The obtained chitin nanofiber-containing film was carefully removed from the slide glasses.

Figure 5:
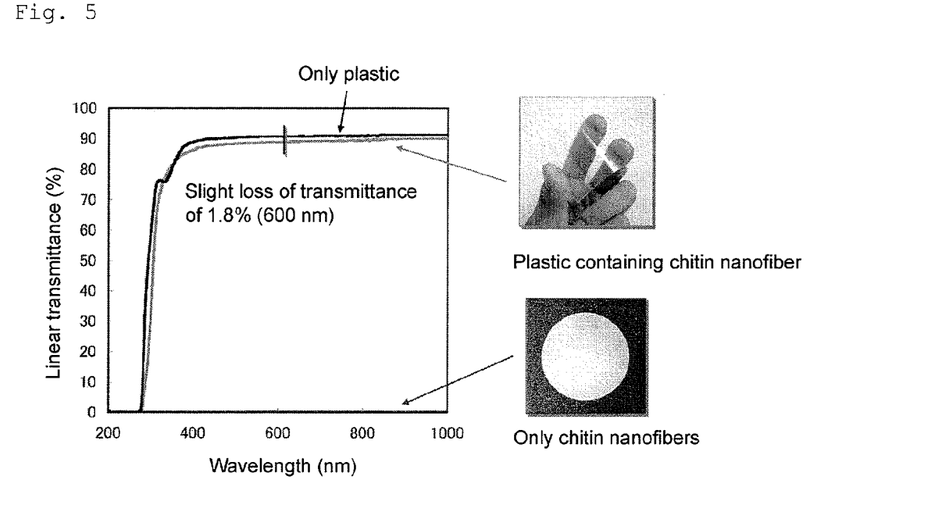
FIG. 5 is a graph showing the results of transmittances of chitin nanofibers derived from a crab shell-containing composite material obtained by the method of the present invention, measured using an ultraviolet and visible spectrophotometer. The upper photograph existing on the light side of the graph shows flexibility of a chitin nanofiber-containing composite material of the present invention, while the lower photograph shows a sheet (resin-free) of chitin nanofibers.
Figure 6:
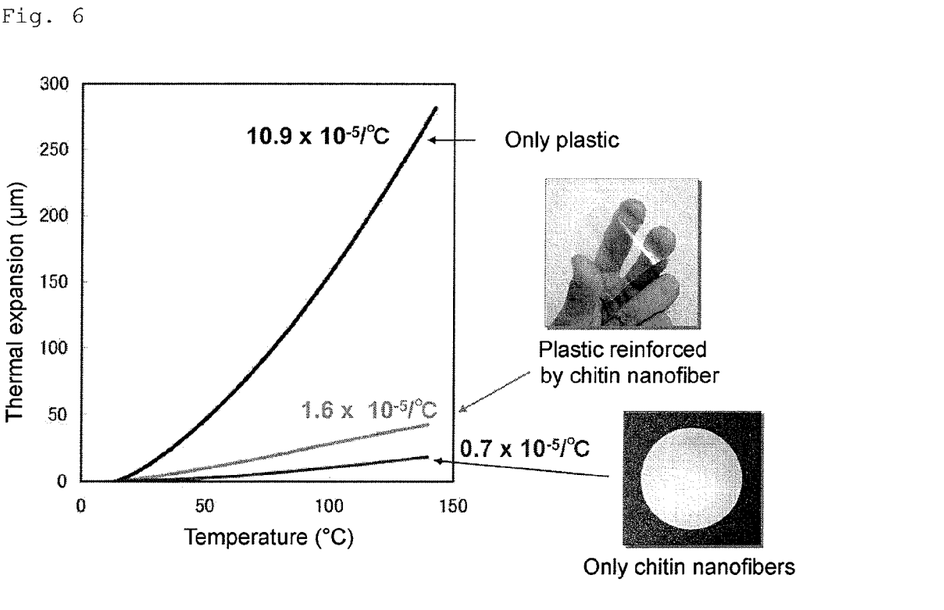
FIG. 6 is a graph showing the results of thermal expansions of chitin nanofibers derived from a crab shell-containing composite material obtained by the method of the present invention, measured using a thermomechanical analysis apparatus. The upper photograph existing on the right side of the graph shows flexibility of a chitin nanofiber-containing composite material of the present invention, while the lower photograph shows a sheet (resin-free) of chitin nanofibers.

The chitin nanofiber-containing film produced by the aforementioned method had a thickness of 69 μm and a fiber content of about 63%. Using an ultraviolet and visible spectrophotometer (UV-4100, Hitachi High-Tech. Corp.), transparency of the chitin nanofiber-containing film obtained above was evaluated. The results revealed that the chitin nanofiber-containing film is a material having very high transparency (linear transmittance in visible light is 88%). For example, when compared with a transparent composite material containing no chitin nanofibers, loss of a light transmittance by chitin nanofibers was just 1.8% at a wavelength of 600 nm (FIG. 5). Using a thermomechanical analysis apparatus (TMA) (TM/SS6100, SII Nanotechnology Inc.), thermal expandability of the chitin nanofiber-containing film was evaluated. The measuring temperature was set in a range from 20 to 165° C. and the temperature raising rate was set at 5° C./minute. As a result, while a thermal expansion coefficient of the film containing no chitin nanofibers was $10.9 \times 10^{-5}$/° C., a thermal expansion coefficient of the chitin nanofiber-containing film was $1.6 \times 10^{-5}$/° C. and the thermal expansion could be decreased by at least 85% (FIG. 6). This is because chitin nanofibers have low thermal expandability (thermal expansion coefficient: $0.7 \times 10^{-5}$/° C.) and therefore expansion of the film is suppressed by compositing. Moreover, as shown in photographs of FIG. 5 and FIG. 6, the thus produced chitin nanofiber-containing films had flexibility, and changes such as break, crack and white turbidity did not arise when the films are bent to such the degree as shown in photographs.

As mentioned above, the chitin nanofiber-containing film obtained by the present invention was a film which has high transparency and high strength, and also has flexibility.

EXAMPLE 5

Production of Coating composition Containing Chitin Nanofibers and Water-Soluble Resin or Emulsion To 71.09 parts of a self-crosslinking acrylic emulsion JONCRYL 1980 (manufactured by BASF), 0.36 part of a wetting agent Dynol 604 (manufactured by Air Products) was added and a preliminary prepared mixed solution of 10.80 parts of an aqueous 1% chitin nanofiber solution (production method will be separately described), 4.27 parts of a cosolvent Dowanol DPM (manufactured by The Dow Chemical Company), 3.06 parts of Dowanol DPnB (manufactured by The Dow Chemical Company) and 0.81 part of Dowanol PPH (manufactured by The Dow Chemical Company) was added, followed by stirring for 1 hour. Next 0.42 part of a defoamer Tego Foamex 805 (manufactured by Troy Chemical), 2.54 parts of a polyethylene wax emulsion JONWAX 26 (manufactured by Johnson Polymer) and 0.18 part of a lubricant Tego Glide 440 (manufactured by Troy Chemical) were sequentially added, followed by further stirring for 1 hour. Next, a preliminarily prepared mixed solution of 0.62 part of Dowanol DPM and 0.63 part of a thickener Tafigel PUR 50 (manufactured by Ultra Additives, Inc.) was added, and then 5.23 parts of water was finally added, followed by stirring for 1 hour to obtain the objective coating material solution.

A uniform coating film was formed by coating the obtained coating material solution on a cedar board material (measuring 50 mm×50 mm×10 mm) using a brush. The coating film exhibited strong adhesiveness to the board material and a cross cut test (JIS 5600-5-5) was carried out. As a result, peeling was not recognized.

EXAMPLE 6

Production of Chitosan Nanofibers from Prawn Shells

Figure 7:
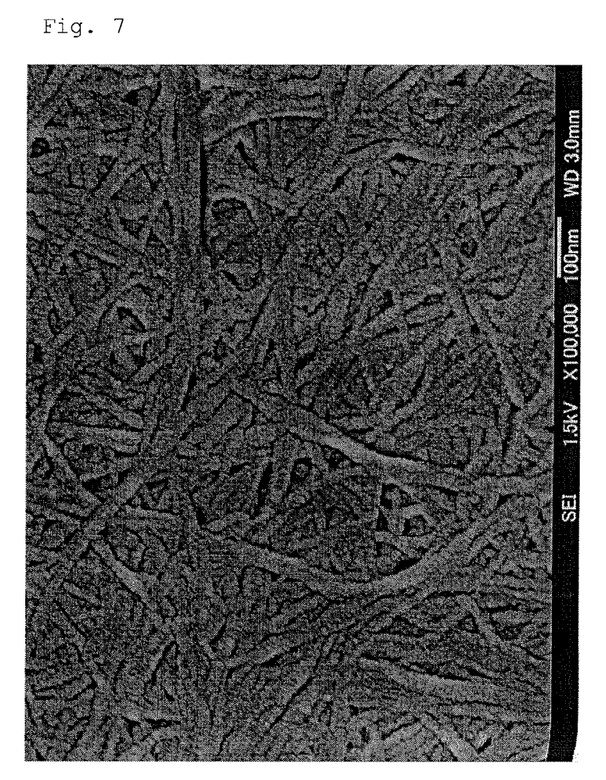
FIG. 7 is a micrograph of chitosan nanofibers derived from prawn shells obtained by the method of the present invention, taken using a scanning electron microscope (FE-SEM). The magnification is 100,000 times.

Shells (10 g) of fresh black tiger prawns were added to an aqueous 5% KOH solution and a protein in prawn shells was removed by refluxing for 6 hours. The treated prawn shells were filtered and then well washed with water until neutral. The prawn shells were stirred in an aqueous 7% HCl solution at room temperature for 2 days to remove an ash component in the prawn shells. Again, the prawn shells were filtered and well washed with water until neutral. The treated prawn shells were added to a 0.3 M sodium acetate buffer solution of 1.7% $NaClO_2$ and a pigment component contained in the prawn shells was removed by stirring at 80° C. for 6 hours. Again, the prawn shells were filtered and well washed with water until neutral. To the prawn shells from which the protein, the ash component and the pigment component were removed, 40% sodium hydroxide was added and deacetylation was carried out by refluxing for 6 hours while always bubbling a nitrogen gas. Again, the prawn shells were filtered and well washed with water until neutral. The prawn shells were dispersed in water and the obtained dispersion was crushed by a domestic mixer, and then prawn shells was fibrillized into chitosan nanofibers by a stone mill type triturating machine (Supermasscolloider (MKCA 6-2)). A yield of chitosan nanofibers was 10%. The obtained chitosan nanofibers were observed by a scanning electron microscope (FE-SEM) (JSM-6700F, JEOL). In almost all of the fibers, a lot of homogeneous nanofibers having a width of about 40 nm or less (a width of about 20 nm on average) were recognized (FIG. 7). The substitution degree of an N-acetyl group of chitosan nanofibers obtained from the results of elemental analysis was 33%.

EXAMPLE 7

Production of Coating Composition Containing Chitosan Nanofibers and Emulsion To 71.13 parts of a self-crosslinking acrylic emulsion JONCRYL 8383 (manufactured by BASF), 0.36 part of a wetting agent Dynol 604 (manufactured by Air Products) was added and a preliminary prepared mixed solution of 19.96 parts of an aqueous 2% chitosan nanofiber solution (production method will be separately described), 1.55 parts of a cosolvent Dowanol DPM (manufactured by The Dow Chemical Company) and 3.59 parts of Dowanol DPnB (manufactured by The Dow Chemical Company) was added, followed by stirring for 1 hour. Next, 0.42 part of a defoamer Tego Foamex 805 (manufactured by Troy Chemical), 2.58 parts of a polyethylene wax emulsion JONWAX 26 (manufactured by Johnson Polymer) and 0.18 part of a lubricant Tego Glide 440 (manufactured by Troy Chemical) were sequentially added, followed by further stirring for 1 hour. Finally, 0.23 part of a thickener Cognos DSX-1550 (manufactured by Henkel) was added, followed by stirring for 1 hour to obtain the objective coating material solution.

INDUSTRIAL APPLICABILITY

The present invention can be utilized in the field where nanofibers are used. The present invention can also be utilized in the production of a composite material and a coating material, and the field where they are used.

The invention claimed is:

1. A method for producing chitin nanofibers composed of an extended-chain crystalline structure comprising:
   subjecting a material obtained from a chitin-containing organism to at least one deproteinization step and at least one deashing step,
   subjecting the deproteinized and deashed material to a step of treating with an acidic reagent, and
   subjecting the treated material to a fiber-loosening step, wherein:
   the chitin-containing organism is a crab or prawn,
   the acidic reagent is a weak acid,
   a pH in the step of treating with an acidic reagent is from 3 to 4,
   the fiber-loosening step is performed with a stone mill type triturating machine or a high-pressure homogenizer, and
   each step is carried out without drying, thereby preventing the chitin nanofibers from aggregation by hydrogen bonding.

* * * * *